United States Patent
Kapus

[11] Patent Number: 5,706,778
[45] Date of Patent: Jan. 13, 1998

[54] FUEL INJECTION SYSTEM COMPRISING AN INJECTION VALVE FOR A SELF-IGNITING INTERNAL COMBUSTION ENGINE

[75] Inventor: Paul Kapus, Graz, Austria

[73] Assignee: AVL Gesellschaft Für Verbrennungskraftmaschinen Und Messtechnik m.b.H. Prof.Dr.Dr.h.c. Hans List, Graz, Austria

[21] Appl. No.: 606,916

[22] Filed: Feb. 26, 1996

[30] Foreign Application Priority Data

Feb. 28, 1995 [AT] Austria ............................ 106/95

[51] Int. Cl.⁶ .................... F02B 19/10; F02B 3/08; F16K 31/06; F02M 61/06
[52] U.S. Cl. .................. 123/276; 123/299; 251/129.21; 239/533.7
[58] Field of Search ................... 123/276, 472, 123/531, 298, 299; 239/533.3, 533.7, 533.9; 335/261; 251/129.21

[56] References Cited

U.S. PATENT DOCUMENTS

| | | | |
|---|---|---|---|
| 4,313,571 | 2/1982 | Bellicardi et al. | 251/129.21 |
| 4,721,080 | 1/1988 | Moriyasu et al. | 123/276 |
| 4,810,985 | 3/1989 | Mesenich | 335/261 |
| 4,984,549 | 1/1991 | Mesenich | 123/472 |
| 5,088,467 | 2/1992 | Mesenich | 123/531 |
| 5,329,902 | 7/1994 | Sakamoto et al. | 123/276 |
| 5,335,861 | 8/1994 | Matusaka | 239/533.7 |
| 5,494,223 | 2/1996 | Hall et al. | 251/129.21 |

*Primary Examiner*—Willis R. Wolfe
*Attorney, Agent, or Firm*—Watson Cole Stevens Davis, P.L.L.C.

[57] ABSTRACT

A fuel injection system which includes an injection valve for a self-igniting internal combustion engine with direct fuel injection, in particular for liquefied gas fuels, and which is configured as a pintle-type nozzle opening against the force of at least one spring, has the opening force of its fuel needle directly provided by the magnetic force of a solenoid so as to create simplified rate shaping. The magnetic force increases quadratically with the needle lift vis-a-vis the force of the spring increasing linearly with the needle lift, resulting in an opening velocity of the needle increasing approximately quadratically, at least in certain regions, thus permitting small pintle lifts, and the needle has a maximum needle lift of smaller than 1 mm, i.e., preferably smaller than 0.5 mm.

9 Claims, 3 Drawing Sheets

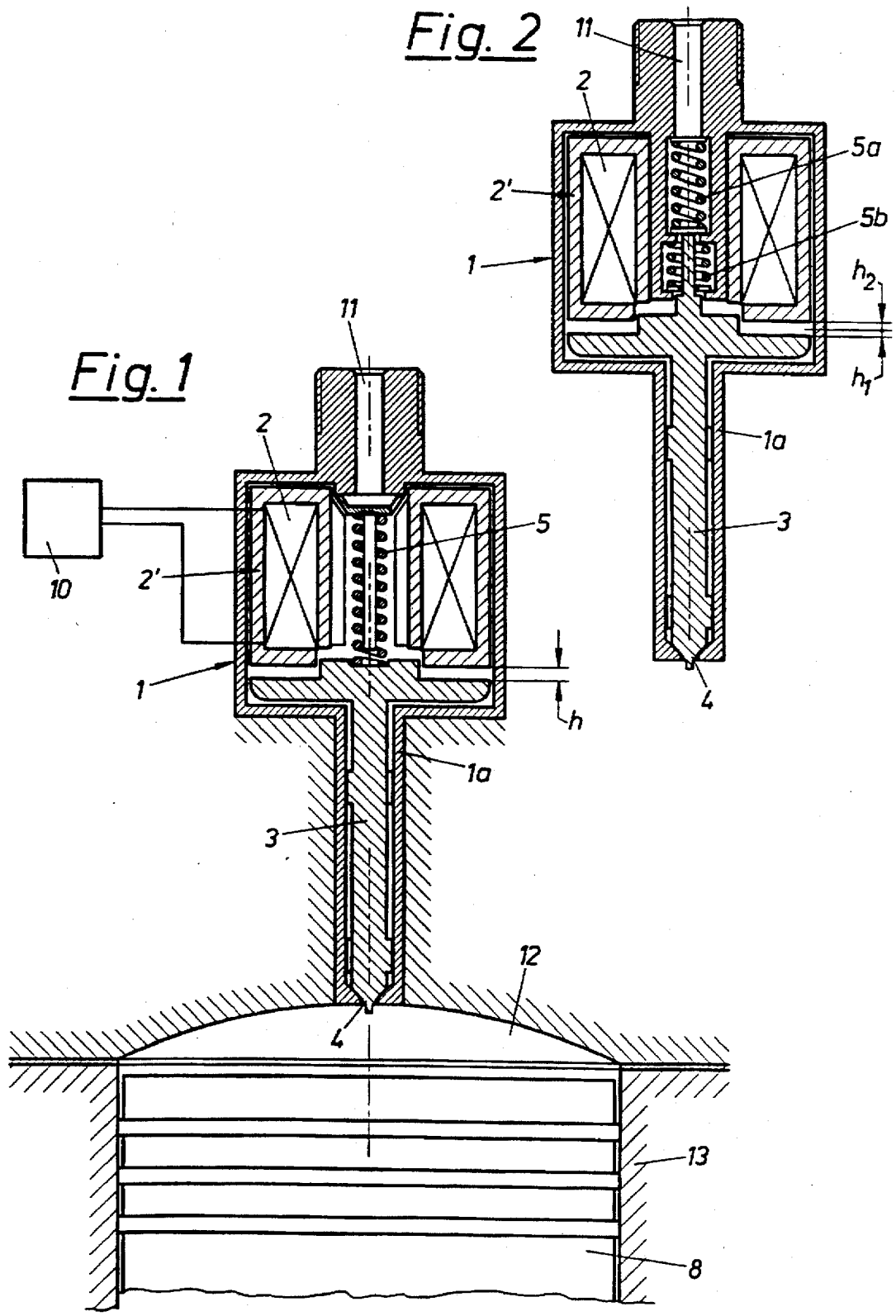

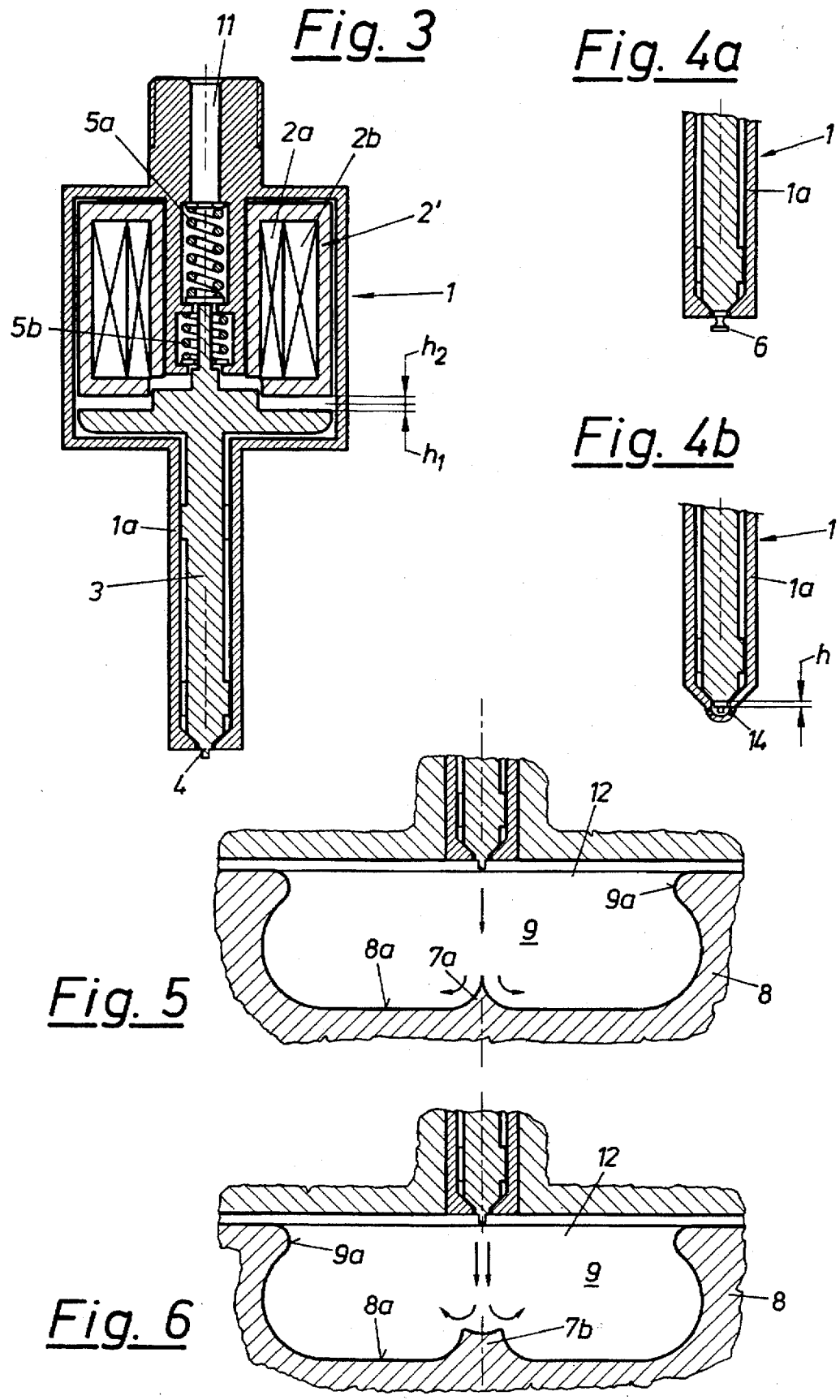

FUEL INJECTION SYSTEM COMPRISING AN INJECTION VALVE FOR A SELF-IGNITING INTERNAL COMBUSTION ENGINE

BACKGROUND OF THE INVENTION

The invention relates to a fuel injection system which includes an injection valve for a self-igniting internal combustion engine with direct fuel injection, in particular for liquefied gases, which is configured as a pintle-type nozzle opening against the force of at least one spring and permitting a throttled fuel flow during part of the lift of the fuel needle due to the stepwise opening of the nozzle cross-section during the needle lift.

DESCRIPTION OF THE PRIOR ART

Fuel injection systems for diesel engines have hydraulically operated fuel needles, i.e., a pump is used to apply fuel pressure, which will open the needle against the force of a spring once the needle opening pressure has been surpassed. In some systems the point in time when the fuel pressure is applied on the needle may be chosen by opening a solenoid valve. Direct operation of the fuel needle by the solenoid valve is not employed in diesel injection systems, as the injection pressures permissible with solenoids are not high enough for mixture formation in diesel engines.

For rate shaping in diesel engines with indirect fuel injection single-hole pintle-type nozzles are used. The pintle will check the fuel flow in the nozzle and reduce the rate of flow compared to the fully opened nozzle, so that combustion will be initiated less sharply. With a hydraulically operated fuel needle the opening velocity is approximately linear. During the lifting of the pintle the flow of the injected fuel is reduced. After this there is a strong increase in flow. The throttling characteristic thus primarily depends on the pintle lift and the geometry of the pintle.

In diesel engines with direct fuel injection dual-spring nozzle holders are employed, where the fuel needle overcomes the force of two springs placed one behind the other. As a consequence, the characteristic of the needle opening velocity is nonlinear. To improve mixture formation multi-hole nozzles are used in such instances.

Other known fuel injection systems are used in Otto engines with direct injection, in which the fuel needle is directly opened by a solenoid valve against the force of a spring. This is made possible by the comparatively low injection pressures required for Otto engines as compared to those which are necessary for diesel engines. Since in Otto engines with direct fuel injection the injection point usually is far advanced relative to the ignition point, rate shaping would not achieve its aim and is not provided.

For special liquefied gases which are burnt in engines with direct fuel injection based on the diesel principle, the use of rate shaping is desirable and of advantage, however. Although it would be possible to employ rate shaping with a hydraulically operated fuel needle as known from the diesel engine, the complexity and expense involved in its construction would be relatively high. In diesel engines this expense is justified on account of the high injection pressures encountered.

SUMMARY OF THE INVENTION

It is an object of the invention to develop a fuel injection system with rate shaping for the injection of liquefied gas, whose construction is kept as simple as possible.

In the invention this is achieved by providing that the opening force of the needle be directly provided by the magnetic force of a solenoid, where the magnetic force increases quadratically with the needle lift as opposed to the force of the spring increasing linearly with the needle lift, will result in an opening velocity of the needle increasing approximately quadratically, at least in certain regions, thus permitting small pintle lifts, and where the needle has a maximum needle lift of smaller than 1 mm, i.e., preferably smaller than 0.5 mm. The small initial velocity of the needle will result in a long period of reduced flow, in spite of the small pintle lift. In this way the needle lifts may be considerably reduced, compared to their normal height of about 1 mm in pintle-type nozzles which is required to obtain a flow that is sufficiently reduced. Due to the combined action of magnetic force and spring force the opening velocity up to the maximum needle lift may increase by a factor of ten and more. A very small opening velocity may be obtained by providing that the characteristic of the spring force in the throttled region be approximately parallel to the tangent to the characteristic of the magnetic force at the closing point of the needle.

In view of the low injection pressures possible with liquefied gases, the fuel needle may be directly operated by a solenoid. The main advantage of using a fuel needle that is directly operated by a solenoid is that leakages along the guide of the needle are avoided and that no pressure relief is required for the space behind the needle. It is good to avoid such unloading since the pressure level prevailing in systems running on liquefied gas is at least that of vapor pressure, unlike the atmospheric pressure prevailing in diesel engines. With a hydraulically operated injection valve there would be a strong drop in efficiency since the opening pressure would have to overcome the pressure behind the fuel needle in addition to the force of the spring.

Like in diesel engines, fuel injection takes place just before ignition, the latter being initiated when the self-ignition temperature is exceeded. For this reason rate shaping is essential to obtain low nitrogen oxide emissions and quiet running of the engine. The system of the invention thus exhibits the simple design of fuel injection systems used in Otto engines in addition to effecting rate shaping in a simple manner.

It is proposed in a very advantageous variant of the invention that the spring force acting on the fuel needle be provided by two serially placed springs with different characteristics. The fuel needle presses against the two springs located one behind the other, of which the first, weaker spring opens even if the solenoid forces applied are weak. The second spring, which joins the first spring when the lift permitted by the first spring is surpassed, opens only if strong solenoid forces are applied. After the first spring has opened a certain length of time is required until the solenoid force rises to the value needed to open the second spring, during which time the pintle will remain in the throttling region.

It is provided in a preferred variant that the electromagnet have at least two solenoids to be activated independently of each other for control of the magnetic force acting on the fuel needle. The fuel needle is operated by the two solenoids which are connected in series. The first solenoid will apply a certain force which will open the needle until the throttling position is reached. When the second solenoid is additionally energized the solenoid force will rise so that the nozzle will open completely. By suitably choosing the activation times of the solenoids the timing of the reduced flow may be adjusted as desired. To support stepped movement of the fuel needle serially placed springs may be added.

In another preferred variant of the invention the proposal is put forward that the fuel needle have a fuel jet deflector at its pintle tip. Such a fuel jet deflector is used to deflect the injected fuel stream towards the rim of a piston cavity. It is used in engines where the geometry of the cavity does not permit a sufficient length of the free fuel jet if a normal pintle-type nozzle is used.

Instead of the fuel jet deflector at the fuel needle, a fuel jet deflector could be provided in the piston cavity. This will be particularly useful if there is not enough space in the piston for a sufficiently deep cavity and if no fuel jet deflector is used at the nozzle. The fuel injection system of the invention may be provided with a needle valve either opening towards the inside or towards the outside in the direction of the combustion chamber.

It is further possible to provide several nozzle holes in the injection valve instead of the fuel jet deflectors.

BRIEF DESCRIPTION OF THE DRAWINGS

The invention will now be further described with reference to the accompanying drawings, in which FIGS. 1 to 3 are longitudinal sections of different variants of the fuel injection valve proposed by the invention, FIG. 4a is a longitudinal section of a fuel needle provided with a fuel jet deflector, FIG. 4b shows an injection valve with several nozzle holes, FIGS. 5 and 6 show the injection system of the invention with a fuel jet deflector on the bottom of the piston cavity, FIG. 7 gives another variant of the invention, the nozzle opening towards the outside.

Elements of identical function have identical reference numbers.

DETAILED DESCRIPTION OF PREFERRED EMBODIMENTS

Figure 7:
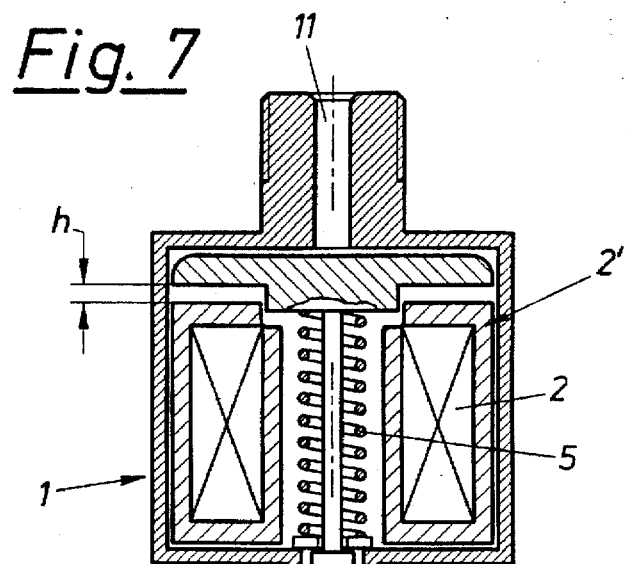

The fuel injection system shown in FIG. 1 essentially comprises an injection valve or nozzle 1 injecting directly into a cylinder space 12, with a housing 1a, an electromagnet 2' with a solenoid 2, and a fuel needle 3 with a pintle tip 4, the needle 3 acting as an armature for the solenoid 2 and pressing against the spring 5. The fuel supply line is marked 11. If the fuel needle 3 is directly operated by a solenoid 2, which itself is controlled via a control unit 10, the nonlinearity of the magnetic force $F_{mag}$ vis-a-vis the linear spring force $F_F$ may be utilized to vary the velocity of the needle lift x. The magnetic force $F_{mag}=C_1/x^2$ and the spring force $F_F=C_2 {}^* x+F_0$. $F_0$, $C_1$, $C_2$ are constants, x stands for the needle lift. In view of the quadratic growth of the lifting velocity due to the combined action of the magnetic force $F_{mag}$ and the spring force $F_F$, the needle 3 will remain for a longer time in the throttled region and the flow-reducing effect of the pintle tip 4 is increased.

Due to the strongly nonlinear opening velocity of the needle it is further possible to reduce the needle, lift x necessary for the desired flow regulation, such that a very small air gap h will suffice between the fuel needle 3 and the solenoid 2. The very small air gap h will permit the use of a very small solenoid 2. For practical purposes the opening velocity of the needle 3 should be as small as possible in order to obtain the desired throttling effect of the pintle tip 4, which is effective only in a very small range of the needle lift x, i.e., 0.05 mm, approximately.

FIG. 2 shows a variant of the fuel injection valve 1 of the invention, with a single solenoid and two springs 5a and 5b which are placed one behind the other. The first, weaker spring 5a will open even if only weak magnetic forces $F_{mag}$ are applied by the solenoid 2. The second spring 5b, which becomes effective when the lift hi released by the first spring 5a is surpassed, will open only if a strong magnetic force $F_{mag}$ is provided. After the first spring 5a has opened, a certain length of time is required until the magnetic force $F_{mag}$ grows sufficiently strong to open the second spring 5b, during which time the fuel needle 3 will remain in the throttling position. The symbol $h_2$ refers to the lift of the second spring 5b.

FIG. 3 presents a third variant of the invention with two solenoids 2a and 2b connected in series. The first solenoid 2a produces a certain force $F_{mag,1}$, which will lift the needle 3 to the throttling position through the lift $h_1$. When the second solenoid 2b is additionally energized, the magnetic force $F_{mag}$ will grow by $F_{mag,2}$ of the second solenoid 2b, such that the nozzle will open completely. By suitably timing the operation of the solenoids 2a and 2b, the timing of the reduced flow may be adjusted as desired. As indicated in FIG. 3, the stepped movement of the fuel needle 3 may be supported by the additional use of serially placed springs 5a, 5b, in analogy to FIG. 2.

To obtain complete evaporation of the throttled fuel jet in the combustion chamber, a fuel jet deflector 6 is advantageously used at the pintle tip 4. With the use of such a deflector the injected fuel stream is deflected towards the rim 9a of a cavity 9 provided in a reciprocating piston 8 in the cylinder 13, as is shown in FIG. 4a. Instead of the fuel jet deflector 6 at the pintle tip 4, a fuel jet deflector 7a, 7b may be provided in the piston cavity 9, as is shown in FIGS. 5 and 6. In the variant shown in FIG. 5 the fuel jet deflector 7a deflects the injected fuel along the bottom 8a of the piston cavity 9. The fuel jet deflector 7b indicated in FIG. 6 has a concave shape and deflects the fuel in the direction of the cavity rim 9a. Instead of using fuel jet deflectors, the fuel injection valve 1 may be provided with several nozzle holes 14, as is shown in FIG. 4b.

FIG. 7 presents another variant of an injection valve according to the invention, in which the fuel needle 3' opens towards the outside in the direction of the combustion chamber. The valve operates on the same principle as described in FIGS. 2 and 3, with the exception that the direction of the magnetic force $F_{mag}$ and the spring force $F_F$ is reversed. Again, variants with one or two series-connected solenoids 2a, 2b and/or springs 5a, 5b are possible.

Figure 8:
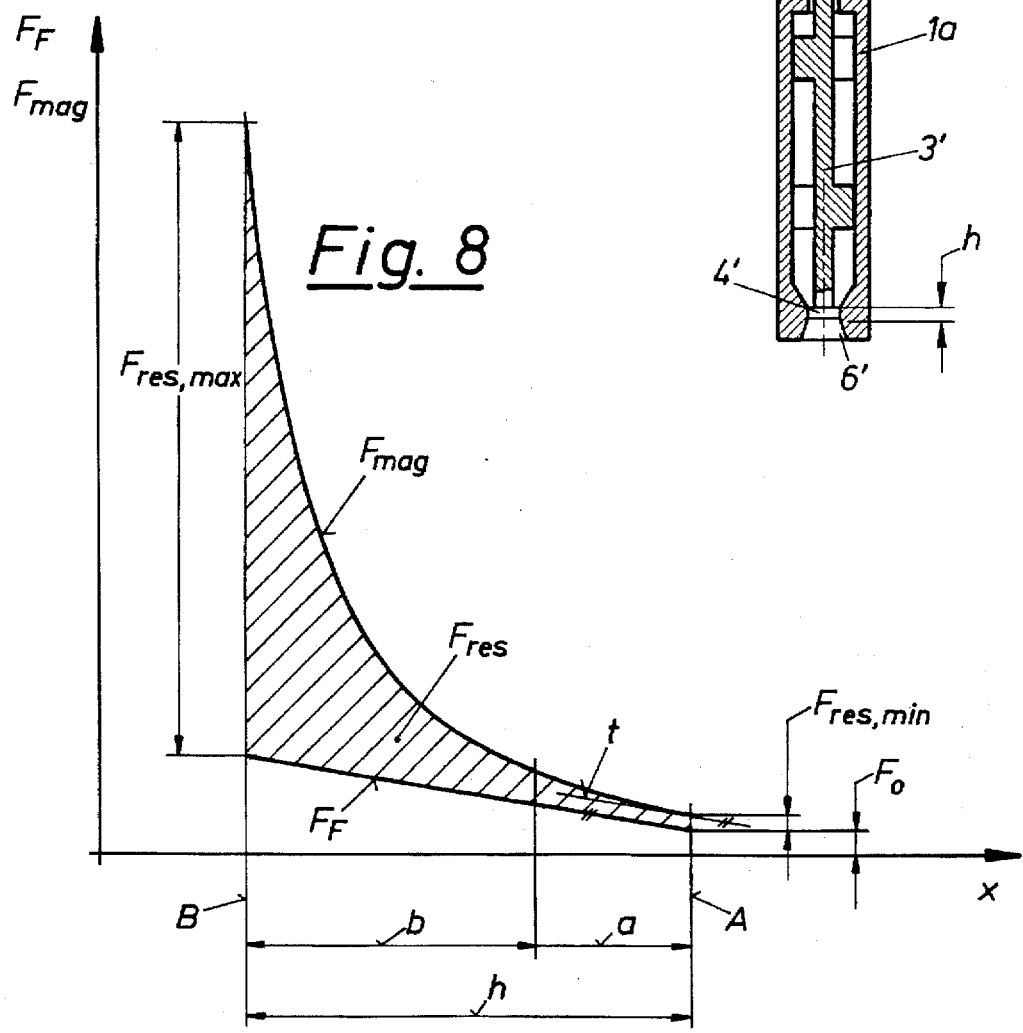
FIG. 8 is a force/lift diagram.

FIG. 8 shows a diagram in which the magnetic force $F_{mag}$ and the spring force $F_F$ are plotted against the needle lift x, the symbols A and B referring to the needle in its closed and open position, respectively. The resultant force $F_{res}$ acting on the fuel needle is the difference of magnetic force $F_{mag}$ and spring force $F_F$, and is indicated by the hatched area in the diagram. The opening velocity is proportional to the resultant force $F_{res}$ and will thus increase approximately quadratically as the magnetic force $F_{mag}$ increases. In the initial region of the lift x indicated by the symbol a, i.e., in the first third, the needle opens at low velocity and the injected fuel is flow-reduced. In this initial region a the spring characteristic $F_F$ is approximately parallel to a tangent t to the parabolic characteristic of the solenoid when the needle is in its closed position A. Beyond the initial region a the velocity of the needle grows rapidly until the full opening position B is assumed. The region of rapidly growing velocity is marked b. The maximum resultant force $F_{res,max}$ and thus maximum opening velocity may amount to more than ten times the initial value. The minimum resultant force when the needle is closed is referred to as $F_{res,min}$.

I claim:

1. A fuel injection system for use in a self-igniting internal combustion engine which defines a cylinder containing a reciprocating piston and which provides a combustion chamber, said fuel injection system comprising an injection valve for direct fuel injection of liquified gases into said combustion chamber, said injection valve including a housing defining a discharge nozzle, a fuel needle located in said housing and having a pintle tip that moves up to about 1 mm relative to said nozzle to close said nozzle or to open said nozzle to provide a throttled fuel flow therethrough, a spring located within said housing to bias said fuel needle into a closed position relative to said nozzle, and an electromagnet means for directly applying a force on said fuel needle to lift said fuel needle against said bias of said spring and lift said fuel needle so as to open said nozzle, magnetic force from said electromagnet means increasing quadratically with lift of said needle against a linearly increasing bias force of said spring, resulting in an approximately quadratically increasing opening velocity of said fuel needle in certain regions to permit small pintle lift, wherein said electromagnet means comprises a solenoid, wherein said fuel needle includes a generally disc-shaped end portion which is spaced from said solenoid, and wherein said spring extends within said solenoid to abut said disc-shaped end portion to bias said end portion in spaced relation to said solenoid.

2. A fuel injection system according to claim 1, wherein said fuel needle has a maximum needle lift of smaller than 0.5 mm.

3. A fuel injection system according to claim 1, wherein a characteristic of the spring force in a throttled region is approximately parallel to a tangent to a characteristic of the magnetic force at a closing point of said fuel needle.

4. A fuel injection system according to claim 1, wherein the spring force acting on the fuel needle is provided by two serially placed springs with different characteristics.

5. A fuel injection system according to claim 1, wherein said electromagnet has at least two solenoids to be activated independently of each other for control of the magnetic force acting on said fuel needle.

6. A fuel injection system according to claim 1, wherein said fuel needle has a fuel jet deflector at its pintle tip.

7. A fuel injection system according to claim 1, wherein a fuel jet deflector is provided on a bottom of a cavity of said piston, in an area hit by an injected fuel jet of said injection valve.

8. A fuel injection system according to claim 1, wherein said fuel needle opens in the direction of said combustion chamber.

9. A fuel injection system according to claim 1, wherein said injection valve is provided with several nozzle holes.

* * * * *